Jan. 3, 1967　　　M. LOMBARDO　　　3,295,361

LEAK DETECTOR

Filed May 25, 1964

INVENTOR.
Michael Lombardo

BY
Hovey, Schmidt, Johnson & Hovey
ATTORNEYS.

United States Patent Office 3,295,361
Patented Jan. 3, 1967

3,295,361
LEAK DETECTOR
Michael Lombardo, 3101 Edwards Circle,
Independence, Mo. 63125
Filed May 25, 1964, Ser. No. 369,950
6 Claims. (Cl. 73—40.5)

This invention relates to test equipment and, more particularly, to apparatus for detecting leaks in lines adapted for carrying fluids under pressure.

In the construction of new buildings which contain a number of different sections each having its own gas and water systems, all of the gas or water lines of the various sections converge to a single area of the building adjacent to the main fluid conduit. At this area, meters are placed between the main line or conduit and the individual lines leading to the sections to measure the amount of fluid, be it water or gas, to the various sections.

Prior to placing the fluid lines of the sections in operation, steps are taken to assure that there are no fluid leaks in the lines, these steps requiring the expenditure of considerable time and effort on the part of plumbers and other building workers. The conventional leak detection methods require that the system of a given section be tested for leaks and, after this is accomplished then the fluid lines of another section are then tested and so on until all of the sections are successively tested independently of each other. It is evident that these methods are quite time consuming and a unit for simultaneously detecting leaks in a number of different fluid lines is necessary in order to minimize the time required to accomplish this purpose.

The present invention provides a leak detector which can simultaneously detect fluid leaks in a number of different independent fluid lines in a building, for instance. The instant detector is adapted for use at the meter ends of the various lines so that even the smallest leak can be detected throughout the entire length of a given delivery system. Thus, a workman, upon determining which of the lines has a leak therein, can direct his attention to this line after connecting the remaining lines to their meters so as to place them in operation.

It is, therefore, the primary object of the present invention to provide a device for simultaneously detecting leaks in a number of independent fluid delivery lines so as to obviate the conventional methods of leak detection which operate only on a single line at any one time. As a result, the instant invention provides means for minimizing the time and effort expended for accomplishing the aforesaid purpose.

Another object of this invention is the provision of a leak detection unit of the type described which has visual indicating means thereon so that the user thereof may immediately determine not only the specific lines which have leaks, but the relative magnitude of the size of the leak as well.

Still another object of the invention is the provision of a leak detector of the aforesaid character which may be readily coupled with and removed from the various fluid lines to be tested so that elaborate and time-consuming pipe connections are unnecessary so as to minimize the time and effort required to detect leaks in a series of independent lines.

A further important object of the instant invention is the provision of a shiftably mounted leak detector which is movable to a location permitting the charging or pressurization of the lines to be tested by means of the fluid under pressure for actuating the indicating means thereof, whereby no fluid pressure source independent of the source used with the detector is necessary to pressurize the lines to be tested and the pressurization of the detector and the lines may be accomplished simultaneously.

Figure 1:
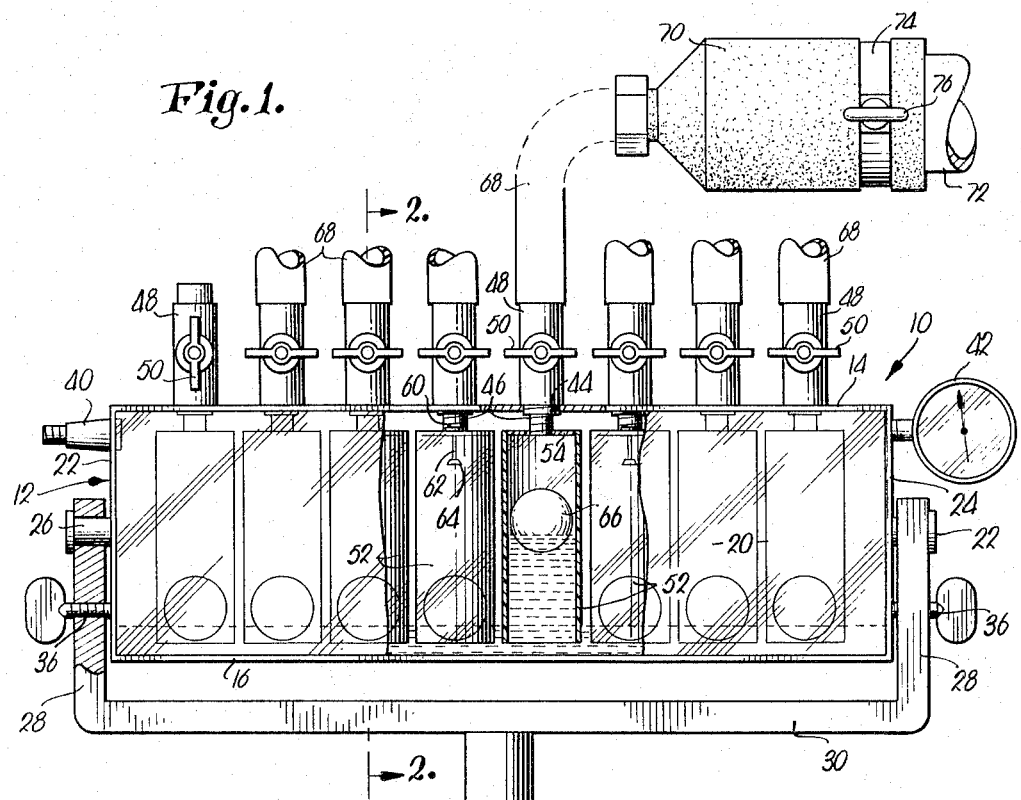
FIGURE 1 is a side elevational view of the leak detector made pursuant to the concepts of the present invention, parts being broken away and in section to illustrate details of construction.

The present invention provides a leak detector having a hollow enclosure or box which is adapted for containing a liquid to a predetermined level therein. A fluid inlet of the box permits the entry of a fluid under pressure thereinto in the space above the level of the liquid. A series of spaced fluid outlets are adapted to be placed in fluid communication with respective fluid conduits or lines to be tested, there being a tube within the enclosure for each outlet respectively. The various tubes are secured in surrounding relationship to the various outlets and have respective openings adjacent their lower ends which are normally below the level of the liquid in the box.

The box is rotatably mounted on a generally upright support so that the tubes can be moved to positions with their openings above the level of the liquid whereby the fluid passing into the box through the inlet may be used to charge the various lines to the same pressure as the pressure within the box above the level of the liquid. Thus, a leak in any one of the lines will be detected by the rise of the liquid in the corresponding tube under the influence of the fluid pressure above the liquid in the box. This is due to the fact that the pressure in the box will be greater than in the leaking line.

Valve means is provided for each tube to exhaust the latter before the liquid passes into the fluid line coupled therewith.

The leak detector is broadly denoted by the numeral 10 and includes an enclosure or box 12 having a top 14, a bottom 16, a pair of sides 18 and 20, and a pair of ends 22 and 24. Side 20 is transparent to permit the viewing of structure within box 12. A pair of pins 26 project laterally from ends 22 and 24 and are rotatably received within the normally upright arms 28 of a U-shaped element 30 rigid to the upper end of an upright support 32. A mounting plate 34 is secured to support 32 adjacent the lowermost end thereof to dispose arms 28 in upright positions and thereby to permit rotation of box 12 about a horizontal axis through pins 26.

A pair of setscrews 36 are threaded through arms 28 and are engageable with ends 22 and 24 to releasably maintain box 12 in any one of a number of fixed positions relative to element 30. End 22 is provided with an inlet opening 38 and a pipe section 40 is rigid to and extends laterally from end 22 in communication with opening 38. Pipe section 40 is adapted to be operably coupled with a source of air or other gas under pressure, inlet opening 38 being disposed adjacent to the junction of top 14 and end 22.

End 24 is provided with an opening and a pressure-measuring meter 42 is secured to end 24 in fluid communication with the opening therein. Meter 42 registers the fluid pressure existing within box 12.

Figures 2, 3:
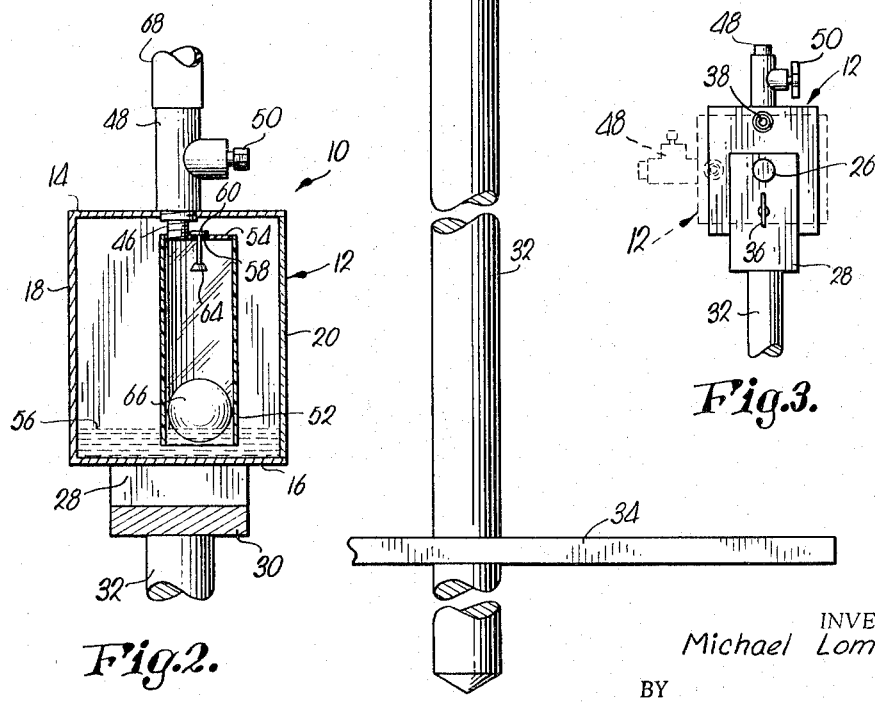
FIG. 2 is a cross-sectional view taken along line 2—2 of FIG. 1.
FIG. 3 is a fragmentary, end elevational view of the detector illustrating a pair of operative positions thereof.

Top 14 is provided with a series of spaced, aligned outlet openings 44, and a nipple 46 is provided for each opening 44 respectively. Nipples 46 are threaded into top 14 and extend inwardly therefrom as shown in FIGS. 1 and 2. A valve 48 is provided for each outlet opening 44 respectively, valves 48 being threaded onto outwardly projecting portions of respective nipples 46 so that valves 48 extend normally upwardly from top 14. A handle 50 is provided for each valve 48 so as to manually open and close the latter.

A transparent tube 52 is also provided for each outlet opening 44 respectively, tubes 52 each having a cap 54 closing the upper end thereof and being open at the lower end thereof. Each cap 54 is threadably mounted on the lower end of the corresponding nipple 46 so that caps 54 are in spaced relationship to the inner surface of top 14.

Each tube 52 is of a length such that its lower end is below the level 56 of a liquid contained in box 12 and normally on bottom 16 thereof. As shown in FIGS. 1 and 2, the lower ends of tubes 52 are in spaced relationship to bottom 16 and define openings through which the liquid may pass or travel upwardly in the tube under the influence of the gas pressure above level 56 in box 12.

Each cap 54 is provided with an orifice 58 which is closed by a valve 60 resting on the upper surface of cap 54. A shank 62 having a weight 64 at the lower end thereof is secured at its upper end to the underside of valve 60. Weight 64 normally maintains valve 60 in a position closing orifice 58 until shank 62 is moved upwardly.

A ball member 66 is carried within each tube 52 respectively, and is buoyant with respect to the liquid in box 12. Ball member 66 serves to raise shank 62 and thereby move valve 60 upwardly with respect to orifice 58 when the level of the liquid reaches a certain height in the corresponding tube 52. Thus, valve 60 assures that none of the liquid will pass out of box 12 through the corresponding outlet opening 44.

In operation, detector 10 is placed in use by mounting plate 34 in a suitable position so that support 32 is in an upright position and box 12 is rotatable about a generally horizontal axis through pins 26. A number of flexible hoses 68 having heads 70 releasably coupled with the conduits 72 to be tested, are coupled with the outer ends of valves 48 as shown in FIGS. 1 and 2. Each head 70 is formed from a resilient material and is provided with a band 74 which may be tightened upon rotating a handle 76 coupled with band 74. As a result, heads 70 are releasably coupled to and uncoupled from conduits 72 in a minimum of time. The valves 48 corresponding to the conduits 72 to be tested are opened by manipulating handles 50. Valves 48 which are not to be used are maintained in closed conditions to maintain box 12 substantially air-tight during operation.

A liquid, such as water or other substance having a relatively low freezing point, is directed into box 12 through inlet opening 38, or any one of the outlet openings 44, until the liquid reaches level 56 or some other level above the lower extremities of tubes 52. Pipe section 40 is then operably coupled to a source of gas under ppressure such as air or the like, and box 12 is rotated to the dashed line location of FIG. 3 or until the lower open ends of tubes 52 are above the liquid level in the box. The gas is then admitted into box 12 and, with valves 48 open, the gas will simultaneously charge the various conduits 72, as well as the interior of box 12. Thus, box 12 and conduits 72 will initially all be at the same fluid pressure. It is noted that box 12 is tilted to the aforesaid position after setscrews 36 have been moved out of frictional engagement with ends 22 and 24.

After box 12 and conduits 72 have been charged, box 12 is again rotated to the full-line position of FIG. 3 to where the lower ends of tubes 52 are once again below level 56 of the liquid in box 12.

If there is a leak in any one of the conduits 72, the pressure in box 12 will be greater than that in the leaking conduits 72 after a predetermined time and this pressure difference will be denoted by a rise of the liquid in the corresponding tube. For instance, as shown in FIG. 1, the level of the liquid in one of the tubes 52 has risen to a height above level 56, thus indicating that the conduit 72 coupled therewith does, in fact, have a leak therein. To prevent the liquid from rising too high in the tube and from passing into the corresponding conduit 72, the ball member 66 engages weight 64 of the valve 60 to open the latter and exhaust the upper end of the tube 52. Any rise of the liquid in any one of the tubes 52 will indicate a leak in the corresponding conduit 72 and this liquid rise will be immediately observed by the user of detector 10 inasmuch as side 20 and tubes 52 are transparent. The magnitude of the size of the leak may be estimated by the rate at which the liquid rises in the tube associated with the leaking conduit 72.

It is clear that all of the various conduits 72 may be simultaneously tested for leaks with detector 10 even though conduits 72 are independent of each other. The flexibility of hoses 68 permits the rotation of box 12 with respect to support 32. As a result, no elaborate and time-consuming connections need be made in order to couple box 12 to the various conduits 72 and to permit rotation of box 12 relative to support 32.

By the use of a liquid having a low freezing point, detector 10 may be used during cold weather, and valves 60 assure that the liquid does not rise into conduits 72 at any time during the use of detector 10.

Having thus described the invention, what is claimed as new and desired to be secured by Letters Patent is:

1. Apparatus for detecting a fluid leak in a fluid conduit comprising:
   an enclosure having a pair of spaced openings therethrough and being adapted for containing a first fluid therein to a predetermined level below said openings, one of said openings adapted to be coupled to a source of a second fluid under pressure and the other of said openings adapted to be coupled to a conduit to be tested;
   a tube within said enclosure in communication with said other opening and extending toward said first fluid, said tube having an opening therein normally disposed below said level of said first fluid, whereby said first fluid may pass into said tube and said second fluid will force said first fluid upwardly of said tube when said conduit has a leak therein and after the enclosure and the conduit have been subjected to the pressure of said second fluid; and a pressure-responsive valve coupled with said tube adjacent to the upper end thereof and disposed for exhausting the fluid therewithin to said enclosure when the fluid pressure in the tube reaches a predetermined value.

2. Apparatus as set forth in claim 1, wherein said valve is provided with a shank movable in one direction to open the valve, and wherein is provided a member disposed within said tube for movement toward and away from said valve and engageable with said shank for moving the latter in said one direction responsive to the upward movement of said first fluid in said tube.

3. Apparatus for simultaneously detecting fluid leaks in a series of fluid conduits comprising:
   a hollow enclosure having a fluid inlet and a series of spaced fluid outlets, said enclosure being adapted for containing a liquid to a predetermined level therein with said inlet and outlets being normally spaced above said level;
   means on said enclosure at said inlet thereof for coupling the enclosure with a source of a gas under pressure;
   structure on said enclosure at each outlet respectively for placing the outlet in fluid communication with a corresponding conduit to be tested; and
   a tube within said enclosure for each outlet respectively, said tubes being in fluid communication with respective outlets and having open lower ends spaced from said body and normally disposed below said level, whereby the liquid may pass into the tubes and said gas will force the liquid upwardly of the tube corresponding to a leaking conduit after the enclosure and said conduits have been subjected to the fluid pressure of said gas.

4. Apparatus as set forth in claim 3, wherein is provided a support, and means pivotally mounting said enclosure on said support for movement to and from a position with the lower ends of the tubes above the level of the liquid in the enclosure.

5. Apparatus as set forth in claim 3, wherein said enclosure is provided with a top having said outlets therein, said tubes each having a cap closing the normally uppermost end thereof, and means carried by each cap respectively for placing the corresponding tube in fluid communication with the respective outlet, and a pressure-responsive valve in said cap for exhausting the fluid in the tube to said enclosure when the fluid pressure in the tube reaches a predetermined value.

6. Apparatus as set forth in claim 3, wherein is provided a valve for each outlet respectively, said valves being coupled to the enclosure in fluid communication with corresponding outlets and extending outwardly from the enclosure.

References Cited by the Examiner
UNITED STATES PATENTS 3,103,910  9/1963  Smith _____ 73—40
3,177,702  4/1965  Anderson _____ 73—40

LOUIS R. PRINCE, *Primary Examiner.*

JAMES RENJILIAN, *Assistant Examiner.*